United States Patent
Feng

(10) Patent No.: US 11,630,880 B2
(45) Date of Patent: Apr. 18, 2023

(54) FAST FOURIER TRANSFORM CIRCUIT OF AUDIO PROCESSING DEVICE

(71) Applicant: XSail Technology Co., Ltd, Guangdong (CN)

(72) Inventor: Meng-Hao Feng, Guangdong (CN)

(73) Assignee: XSail Technology Co., Ltd, Guangdong (CN)

( * ) Notice: Subject to any disclaimer, the term of this patent is extended or adjusted under 35 U.S.C. 154(b) by 300 days.

(21) Appl. No.: 17/033,665

(22) Filed: Sep. 25, 2020

(65) Prior Publication Data
US 2021/0263991 A1 Aug. 26, 2021

(30) Foreign Application Priority Data
Feb. 25, 2020 (CN) .......................... 202010114963.X

(51) Int. Cl.
*G06F 17/14* (2006.01)
*G06F 7/523* (2006.01)
(Continued)

(52) U.S. Cl.
CPC .......... *G06F 17/142* (2013.01); *G06F 7/4812* (2013.01); *G06F 7/50* (2013.01); *G06F 7/523* (2013.01)

(58) Field of Classification Search
CPC ........... G06F 17/14–142; G06F 7/4812; G06F 7/50–5095; G06F 7/523–5338
See application file for complete search history.

(56) References Cited

U.S. PATENT DOCUMENTS

| 2003/0212722 A1* | 11/2003 | Jain ........................ G06F 17/142 708/404 |
| 2004/0030736 A1* | 2/2004 | Scheuermann ..... G06F 15/7867 708/402 |
| 2020/0319296 A1* | 10/2020 | Gupta ...................... G01S 7/352 |

FOREIGN PATENT DOCUMENTS

| CN | 101937332 | 1/2011 |
| CN | 107544942 | 1/2018 |

(Continued)

OTHER PUBLICATIONS

C. Wang et al., A Low-Cost 256-Point FFT Processor for Portable Speech and Audio Applications, 2007 International Symposium on Integrated Circuits, IEEE 2007 (Year: 2007).*

(Continued)

*Primary Examiner* — Emily E Larocque
(74) *Attorney, Agent, or Firm* — JCIPRNET

(57) ABSTRACT

A fast Fourier transform (FFT) circuit of an audio processing device configured to perform an N-points FFT and including a memory circuit and a butterfly operation unit circuit is provided. The butterfly operation unit circuit reads two points input data from the memory circuit, performs a butterfly operation for the two points input data according to a twiddle factor to generate two points output data, and writes the two points output data into the memory circuit. The butterfly operation unit circuit includes a multiplier and a plurality of adders/subtractors. The multiplier sequentially multiplies real or imaginary coefficients of one of the two points input data by real or imaginary coefficients of the twiddle factor in multiple clock cycles. The multiplier performs a multiplication once in each clock cycle. The adders/subtractors perform addition/subtraction, such that the butterfly operation unit circuit generates the two points output data.

9 Claims, 10 Drawing Sheets

(51) Int. Cl.
*G06F 7/50* (2006.01)
*G06F 7/48* (2006.01)

(56) References Cited

FOREIGN PATENT DOCUMENTS

CN 109992741 A * 7/2019
JP H05174046 7/1993

OTHER PUBLICATIONS

"Notice of allowance of China Counterpart Application", dated Dec. 28, 2022, p. 1-p. 4.

* cited by examiner

| CC1 | CC2 | CC3 | CC4 | CC5 | CC6 | CC7 | CC8 | CC9 | CC10 |
|---|---|---|---|---|---|---|---|---|---|
| Read 1st input data | Read 2nd input data | Read 3rd input data | Read 4st input data | Read 5st input data | Read 6st input data | ... | ... | ... | ... |
| ... | First stage butterfly operation | First stage butterfly operation | First stage butterfly operation | First stage butterfly operation | First stage butterfly operation | First stage butterfly operation | ... | ... | ... |
| ... | ... | Second stage butterfly operation | Second stage butterfly operation | Second stage butterfly operation | Second stage butterfly operation | Second stage butterfly operation | Second stage butterfly operation | ... | ... |
| ... | ... | ... | Thrid stage butterfly operation | Thrid stage butterfly operation | Thrid stage butterfly operation | Thrid stage butterfly operation | Thrid stage butterfly operation | Thrid stage butterfly operation | ... |
| ... | ... | ... | ... | Output 1st output data | Output 2nd output data | Output 3rd output data | Output 4th output data | Output 5th output data | Output 6th output data |
| ... | ... | ... | ... | ... | ... | ... | ... | ... | ... |

FIG. 3

| CC1 | CC2 | CC3 | CC4 | CC5 | CC6 | CC7 | CC8 | CC9 | ... |
|---|---|---|---|---|---|---|---|---|---|
| Send read request for 1st input data | | | | Send read request for 2nd input data | | | | | |
| | First stage butterfly operation | | | | First stage butterfly operation | | | | |
| ... | | Second stage butterfly operation | | | | Second stage butterfly operation | | | |
| ... | | | Thrid stage butterfly operation | | | | Thrid stage butterfly operation | | |
| ... | | | ... | Output 1st output data | | | | Output 2nd output data | |
| ... | | | ... | | | | | | |

FIG. 5

| CC91 | CC92 | CC93 | CC94 | CC95 | CC96 |
|---|---|---|---|---|---|
| Send read request for reading a, c | Send read request for reading b, d | Send read request for reading e | Send read request for reading f | | |
| | a*c | b*d | a*d | b*c | |
| | | a*c−b*d | | a*d+b*c | |
| | | e+(a*c−b*d) | e−(a*c−b*d) | f+(a*d+b*c) | f−(a*d+b*c) |
| | | Output data 1 | Output data 2 | Output data 3 | Output data 4 |

FIG. 10

FAST FOURIER TRANSFORM CIRCUIT OF AUDIO PROCESSING DEVICE

CROSS-REFERENCE TO RELATED APPLICATION

This application claims the priority benefit of China application no. 202010114963.X, filed on Feb. 25, 2020. The entirety of the above-mentioned patent application is hereby incorporated by reference herein and made a part of this specification.

TECHNICAL FIELD

The invention relates to an audio processing circuit, and more particularly, to a fast Fourier transform circuit of an audio processing device.

BACKGROUND

With the advancement of technology, as more and more electronic devices begin to use voice control, it is expected that voice control will become the user interface commonly used by most of electronic devices in the future. It can be known that a recognition rate of speech recognition will directly affect the user experience of the user using the electronic device. In the realization of speech recognition, fast Fourier transform (FFT) has been widely used to provide functions for converting time-domain data to frequency-domain data so speech recognition may be performed according to spectral characteristics of speech signals. Furthermore, most of audio processing devices for speech recognition have an FFT circuit implemented by hardware.

In addition, according to the needs of different fields, the hardware architecture design of the FFT circuit will have different designs. For example, a pipeline architecture suitable for high-speed applications and a memory-based architecture with lower hardware costs have been widely used. Among them, the pipeline architecture allows input data and output data to flow in and out continuously, leading the memory-based architecture in processing efficiency and data throughput. However, the pipeline architecture has higher hardware cost than the memory reuse architecture. In comparison, the advantages and characteristics of the memory-based architecture are that the circuit area is smaller and the required memory space is less, but its processing efficiency is slower.

FIG. 1 illustrates a signal flow diagram of 8-point fast Fourier transform. FIG. 2 illustrates an FFT circuit of the pipeline architecture. Referring to FIG. 1 and FIG. 2 together, an 8-points fast Fourier transform performed an FFT circuit 20 of the pipeline architecture uses is based on 2 points. The FFT circuit 20 of the pipeline architecture may include a plurality of memory circuits M1 to M4, and butterfly operation modules B1 to B3 of three stages. Here, each of the butterfly operation modules B1 to B3 may include 4 radix-2 butterfly operation units. The memory circuits M1 to M4 are disposed between each two levels of the butterfly operation modules B1 to B3 and at the data input and output ends, respectively.

The butterfly operation module B1 may read input data x[0] to x[7] from the memory circuit M1 to perform a first stage butterfly operation (i.e., 4 radix-2 butterfly operations), and write an operation result of the butterfly operation module B1 into the memory circuit M2. Next, the butterfly operation module B2 may read the operation result of the butterfly operation module B1 from the memory circuit M2 to perform a second stage butterfly operation (i.e., 4 radix-2 butterfly operations), and write an operation result of the butterfly operation module B2 into the memory circuit M3. The rest may be arrived at by deduction. After the third stage butterfly operation is performed, the butterfly operation module B3 of the third stage may write output data X[0] to X[7] into the memory circuit M4.

FIG. 3 is a timing diagram illustrating 8-point radix-2 Fast Fourier transform operation of the pipeline architecture. Referring to FIG. 2 and FIG. 3, in a clock cycle CC1, $1^{st}$ input data is written into the memory circuit M1. In a clock cycle CC2, the butterfly operation module B1 may read the $1^{st}$ input data from the memory circuit M1 to perform the first stage butterfly operation, and write the operation result into the memory circuit M2. In a clock cycle CC3, the butterfly operation module B2 may perform the second stage butterfly operation for the $1^{st}$ input data, and write the operation result into the memory circuit M3. In a clock cycle CC4, the butterfly operation module B3 may perform the third stage butterfly operation for the $1^{st}$ input data, and write the operation result into the memory circuit M4. In a clock cycle CC5, the memory circuit M4 provides the output data to other subsequent circuits. It should be noted that, by storing butterfly operation results from each stage into the corresponding memories, each hardware module forming the pipeline architecture can operate continuously in multiple clock cycles. Accordingly, as shown in FIG. 3, the FFT circuit 10 needs 5 clock cycles to complete an FFT operation for one input data, and 6 clock cycles to complete the FFT operation for two input data.

On the other hand, FIG. 4 illustrates an FFT circuit of the memory-based architecture. Referring to FIG. 1 and FIG. 4 together, an 8-point fast Fourier transform performed an FFT circuit 40 of the memory-based architecture is based on two points. The FFT circuit 40 of the memory-based architecture may include a memory circuit M5 and a butterfly operation module B4 coupled to each other. Here, the butterfly operation module B4 may include 4 radix-2 butterfly operation units. Compared to the FFT circuit 10 of FIG. 2, which includes 12 butterfly operation units, the FFT circuit 40 only needs to include 4 butterfly operation units. The butterfly operation module B4 may read input data x[0] to x[7] from the memory circuit M5 to perform 4 radix-2 butterfly operations, and write an operation result back into the memory circuit M5. Then, the butterfly operation module B4 may read the operation result of the first stage butterfly operation from the memory circuit M5 to perform a second stage butterfly operation, and write an operation result back into the memory circuit M5. The rest may be arrived at by deduction. The butterfly operation module B4 may write output data X[0] to X[7] back into the memory circuit M5 after the third stage butterfly operation is performed according to the operation result of the second stage butterfly operation. It should be noted that each time after the butterfly operation is performed, the butterfly operation module B4 will write the operation result back into the memory circuit M5 to overwrite the previously stored data.

FIG. 5 is a timing diagram illustrating the 8-point radix-2 fast Fourier transform operation of the memory-based architecture. Referring to FIG. 4 and FIG. 5, in a clock cycle CC1, $1^{st}$ input data is written into the memory circuit M5. In a clock cycle CC2, the butterfly operation module B4 may read the $1^{st}$ input data from the memory circuit M5 to perform the first stage butterfly operation, and write the operation result into the memory circuit M5. In a clock cycle CC3, the butterfly operation module B4 may perform the second stage butterfly operation for the $1^{st}$ input data, and write the operation result into the memory circuit M5. In a clock cycle CC4, the butterfly operation module B4 may perform the third stage butterfly operation for the $1^{st}$ input data, and write the operation result into the memory circuit M5. In a clock cycle CC5, the memory circuit M5 provides the output data to other subsequent circuits. As shown in FIG. 5, the FFT circuit 40 needs 5 clock cycles to complete an FFT operation for one input data. However, because the FFT circuit 40 reuses the memory circuit M5 is each stage, 9 clock cycles are needed to complete the FFT operation for two input data. Comparing FIG. 3 and FIG. 5, it can be seen that the FFT circuit 10 of the pipeline architecture needs 6 clock cycles to complete the FFT operation for two input data, whereas the FFT circuit 40 of the memory-based architecture takes longer (i.e., 9 clock cycles) to complete the FFT operation for the two input data.

As can be known, the hardware circuit used to implement FFT will directly affect the hardware cost, the circuit area, and the processing efficiency. Therefore, with the increasing application of speech recognition, how to design an FFT circuit that meets the needs of speech recognition is one of the important issues that those skilled in the art are concerned about.

SUMMARY

Accordingly, the invention proposes a fast Fourier transform circuit of an audio processing device capable of effectively reducing the hardware cost and saving the circuit area.

The invention provides a fast Fourier transform of an audio processing device, which is configured to perform an N-points fast Fourier transform, wherein N is a power of 2. The fast Fourier transform circuit includes a memory circuit and a butterfly operation unit circuit. The butterfly operation unit circuit is coupled to the memory circuit. The butterfly operation unit circuit reads two points input data from the memory circuit, performs a butterfly operation for the two points input data according to a twiddle factor to generate two points output data, and writes the two points output data into the memory circuit. The butterfly operation unit circuit includes a multiplier and a plurality of adders/subtractors. The multiplier sequentially multiplies real or imaginary coefficients of one of the two points input data by real or imaginary coefficients of the twiddle factor in multiple clock cycles. The multiplier performs a multiplication once in each clock cycle. The adders/subtractors are coupled to the multiplier to perform an addition/subtraction according to an output of the multiplier or a real coefficient or an imaginary coefficient of the other one of the two points input data, such that the butterfly operation unit circuit generates the two points output data.

The invention provides a fast Fourier transform of an audio processing device, which is configured to perform an N-points fast Fourier transform, wherein N is a power of 2. The fast Fourier transform circuit includes a plurality of radix-2 butterfly operation circuits. Each of the radix-2 butterfly operation circuits performs steps of receiving input data, and performing a butterfly operation for the input data according one twiddle factor of M twiddle factors to generate output data. The butterfly operation includes a plurality of additions/subtractions and a plurality of multiplications decomposed based on a complex operation, and M is a positive integer less than N/2. Each of the radix-2 butterfly operation circuits sequentially performs the additions/subtractions and the multiplications in a plurality of clock cycles, and the multiplication is performed at most once in each of the clock cycles.

Based on the above, in the embodiments of the invention, the butterfly operation of the FFT can be implemented by reusing the multiplier, thereby greatly reducing the number of multipliers. In addition, by optimizing a look-up table recorded with the twiddle factors, the use of the read-only memory can be effectively reduced. As a result, the FFT circuit in the embodiments of the invention can greatly reduce the hardware cost and reduce the circuit area.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the present disclosure and, together with the description, serve to explain the principles of the present disclosure.

FIG. 3 is a timing diagram illustrating 8-point radix-2 Fast Fourier transform operation of the pipeline architecture.

FIG. 5 is a timing diagram illustrating the 8-point radix-2 fast Fourier transform operation of the memory-based architecture.

FIG. 10 is a timing diagram of a radix-2 butterfly operation according to one embodiment of the invention.

DETAILED DESCRIPTION

Figure 1:
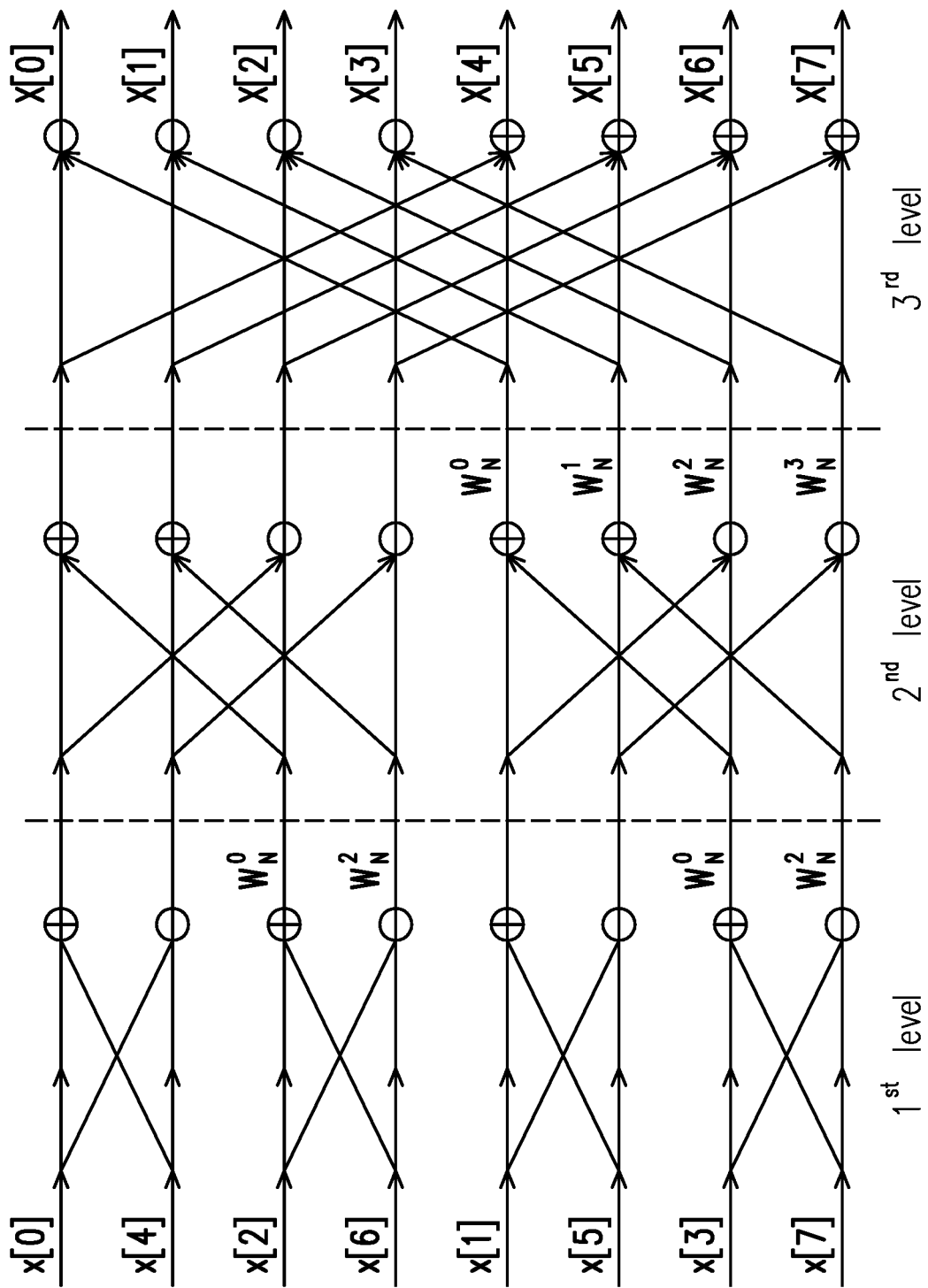
FIG. 1 illustrates a signal flow diagram of 8-point fast Fourier transform.
Figure 2:
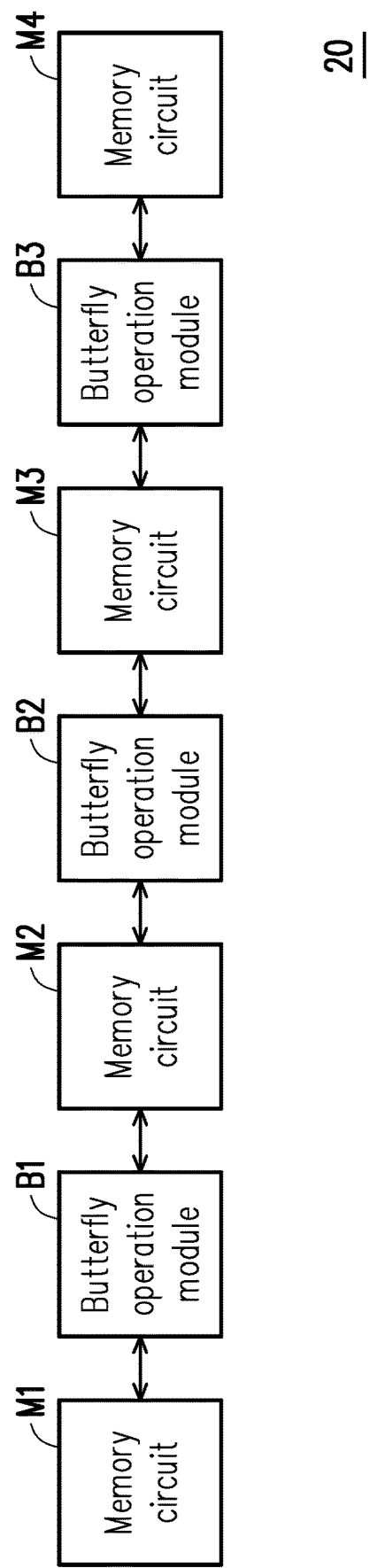
FIG. 2 illustrates an FFT circuit of the pipeline architecture.
Figure 4:
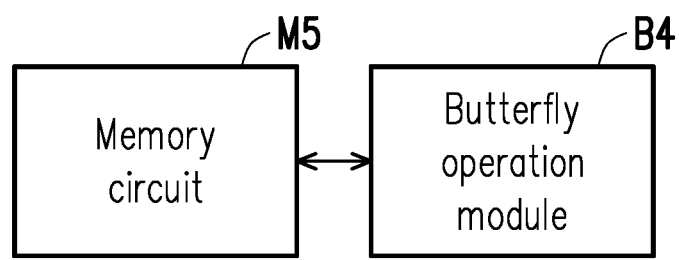
FIG. 4 illustrates an FFT circuit of the memory-based architecture.

Reference will now be made in detail to the present preferred embodiments of the invention, examples of which are illustrated in the accompanying drawings. Wherever possible, the same reference numbers are used in the drawings and the description to refer to the same or like parts.

Figure 6:
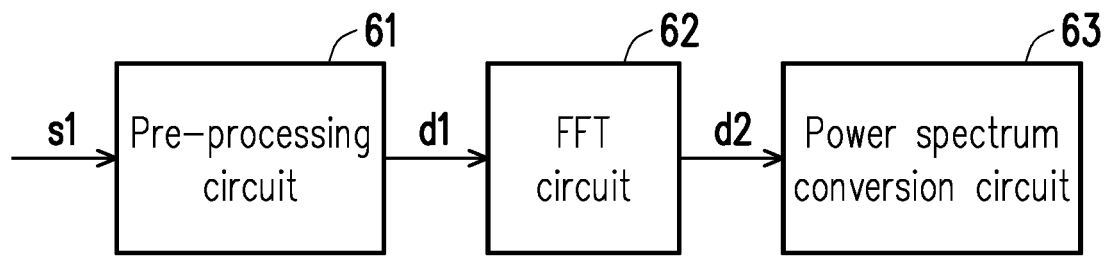
FIG. 6 is a schematic diagram of an audio processing device for speech recognition according to one embodiment of the invention.

FIG. 6 is a schematic diagram of an audio processing device for speech recognition according to one embodiment of the invention. Referring to FIG. 6, an audio processing device 10 for speech recognition may include a pre-processing circuit 61, a fast Fourier transform (FFT) circuit 62 and a power spectrum conversion circuit 63. The pre-processing circuit 61 performs an audio pre-processing for time domain sampled data s1 to generate pre-processed data d1. The audio pre-processing may include a pre-emphasis processing, a frame blocking processing, a hamming windowing processing, and so on. The FFT circuit 62 may perform an FFT operation for the pre-processed data d1 to generate spectral coefficients d2 including a real coefficient and an imaginary coefficient. In detail, the time domain sampled data s1 is generated by sampling an analog audio signal with a sampling frequency of, for example, 8 KHz or 16 KHz. The spectral coefficient d2 is generated by performing the FFT operation for the pre-processed data d1 in a sampling period (i.e., an audio frame). The power spectrum conversion circuit 63 may perform a power spectrum conversion on these spectral coefficients d2 to obtain spectrum characteristics, (i.e., calculate a sum of a square of the real coefficient of the spectral coefficients d1 and a square of the imaginary coefficient of the spectral coefficients d1). Then, the audio processing device 10 may perform the subsequent speech recognition processing according to a result of the power spectrum conversion.

Figure 7:
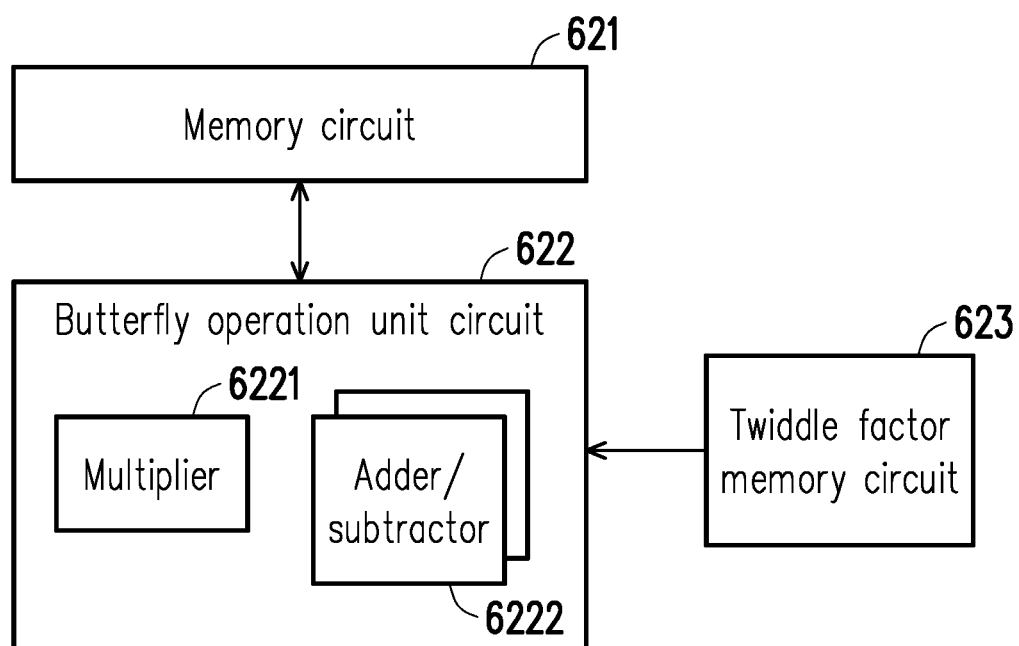
FIG. 7 is a schematic diagram of an FFT circuit according to one embodiment of the invention.

FIG. 7 is a schematic diagram of an FFT circuit according to one embodiment of the invention. Referring to FIG. 7, the FFT circuit 62 of the audio processing device 10 is configured to perform an N-points fast Fourier transform, wherein N is a power of 2. N may be equal to 256, 512, or 1024, which may be determined according to the number of samples in one audio frame. For instance, if one audio frame provided by the pre-processing circuit 61 includes 512 sampling points, the FFT circuit 62 of the audio processing device 10 is configured to perform a 512 points fast Fourier transform. If one audio frame provided by the pre-processing circuit 61 includes less than N sampling points, the FFT circuit 62 of the audio processing device 10 may perform the N-points fast Fourier transform for N points data obtained after the processing. For example, when one audio frame provided by the pre-processing circuit 61 includes 400 sampling points, after the data is filled up to N points (e.g., filled up with 112 "0"), the FFT circuit 62 may then perform the 512 points fast Fourier transform for the data.

In one embodiment, the FFT circuit 62 includes a memory circuit 621, a butterfly operation unit circuit 622 and a twiddle factor memory circuit 623. The memory circuit 621 may be a static random-access memory (SRAM) configured to buffer data during the FFT operation, but not limited thereto. The memory circuit 621 may be coupled to the butterfly operation unit circuit 622 via an internal bus. In addition, the twiddle factor memory circuit 623 is coupled to the FFT circuit 62 and used to store the twiddle factor. The twiddle factor memory circuit 623 may be a read-only memory (ROM) or other non-transitory memory.

In one embodiment, the N-points fast Fourier transform performed by the FFT circuit 62 is based on R points, i.e., the N-points fast Fourier transform includes $\log_R N$ level stage operations. R is an integer greater than 1. However, in order to clearly illustrate the invention, the following description will continue by taking R=2 as an example. That is, the butterfly operation unit circuit 622 performs a radix-2 butterfly operation. The butterfly operation unit circuit 622 reads two points input data from the memory circuit 621, and performs the radix-2 butterfly operation for the two points input data according to the twiddle factor to generate two points output data. Here, the FFT circuit 62 may read the twiddle factor from the twiddle factor memory circuit 623. Then, the butterfly operation unit circuit 622 writes the two points output data into the memory circuit 621. In one embodiment, the butterfly operation unit circuit 622 reads the two points input data from a plurality of memory addresses of the memory circuit 621, and overwrites the two points output data generated by the butterfly operation back to the same memory addresses, so as to reuse a storage space of the memory circuit 621.

Figure 8:
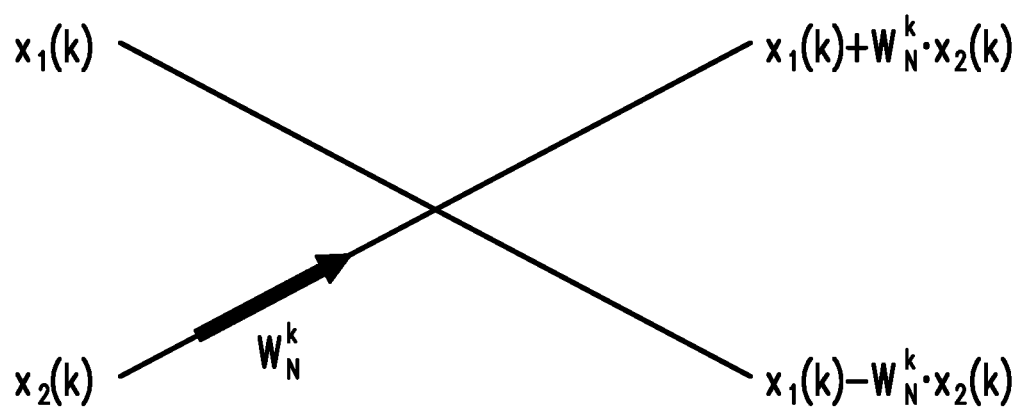
FIG. 8 is a schematic diagram of a radix-2 butterfly operation according to one embodiment of the invention.

It should be noted that, the butterfly operation described above includes a plurality of additions/subtractions and a plurality of multiplications decomposed based on a complex number operation. FIG. 8 is a schematic diagram of a radix-2 butterfly operation according to one embodiment of the invention. The butterfly operation unit circuit 622 reads, from the memory circuit 621, the two points input data, which are $x_1[k]$ and $x_2[k]$, respectively. The butterfly operation unit circuit 622 performs the radix-2 butterfly operation to generate the two points output data, which are $x_1[k]+W_N^k \cdot x_2[k]$ and $x_1[k]-W_N^k \cdot x_2[k]$, respectively. As can be seen, the radix-2 butterfly operation requires two additions/subtractions and one complex multiplication. Further, the complex multiplication may be equivalent to 4 multiplications and 3 additions/subtractions. Thus, for one radix-2 butterfly operation, the butterfly operation unit circuit 622 needs to perform 4 multiplications and 5 additions/subtractions. For instance, if $x_1[k]=e+fi$, $x_2[k]=a+bi$ and a twiddle factor $W_N^k=c+di$, then $x_1[k]+W_N^k \cdot x_2[k]=e+ac-bd+i(f+ad+bc)$ and $x_1[k]-W_N^k \cdot x_2[k]=e-ac+bd-i(f-ad-bc)$. It requires 4 multiplications and 5 additions/subtractions operations to generate two real coefficients and two imaginary coefficients of the two points output data.

In one embodiment, the butterfly operation unit circuit 622 may sequentially perform the additions/subtractions and the multiplications in a plurality of clock cycles, and the multiplication is performed at most once in each of the clock cycles. In other words, the butterfly operation unit circuit 622 may use one single multiplier to perform the multiplications. More specifically, the butterfly operation unit circuit 622 may include a multiplier 6221 and a plurality of adders/subtractors 6222 coupled to the multiplier 6221. The multiplier 6221 may sequentially multiply a real coefficient or an imaginary coefficient of one of the two points input data (e.g., $x_2[k]$ in the previous example) by a real coefficient or an imaginary coefficient of the twiddle factor in the plurality of clock cycles. It should be noted that, the multiplier 6221 performs the multiplication at most once in each of the plurality of clock cycles. The adders/subtractors 6222 perform an addition/subtraction according to an output of the multiplier 6221 or a real coefficient or an imaginary coefficient of the other one of the two points input data (e.g., $x_1[k]$ in the previous example), such that the butterfly operation unit circuit 622 may generate the two points output data accordingly.

In one embodiment, the butterfly operation unit circuit 622 may sequentially perform the additions/subtractions and the multiplication operation in the plurality of clock cycles. These clock cycles include a first clock cycle and a second clock cycle and a third clock cycle. The multiplier 6221 multiplies the real coefficient of one of the two points input data by one of the real coefficient and the imaginary coefficient of the twiddle factor in the first clock cycle to generate a first multiplication output, and the multiplier 6221 multiplies the imaginary coefficient of one of the two points input data by the other one of the real coefficient and the imaginary coefficient of the twiddle factor in the second clock cycle to generate a second multiplication output.

Specifically, in one embodiment, the multiplier 6221 may first multiply the real coefficient of one of the two points input data by the real coefficient of the twiddle factor in the first clock cycle to generate the first multiplication output. Then, the multiplier 6221 may multiply the imaginary coefficient of one of the two points input data by the imaginary coefficient of the twiddle factor in the second clock cycle to generate the second multiplication output. Alternatively, in one embodiment, the multiplier 6221 may first multiply the imaginary coefficient of one of the two points input data by the imaginary coefficient of the twiddle factor in the first clock cycle to generate the first multiplication output. Then, the multiplier 6221 may multiply the real coefficient of one of the two points input data by the real coefficient of the twiddle factor in the second clock cycle to generate the second multiplication output. It should be noted that, the first multiplication output and the second multiplication output of the above two configurations can be used to generate a real coefficient of the two points output data.

In one embodiment, the adders/subtractors 6222 include a first adder/subtractor and a second adder/subtractor. In the case where the first multiplication output and the second multiplication output for generating the real coefficients of the two points output data have been generated, the first adder/subtractor performs an addition/subtraction according to the first multiplication output and the second multiplication output in the second clock cycle to obtain a first addition/subtraction output. Further, the second adder/subtractor performs an addition/subtraction according to the first addition/subtraction output and the real coefficient of the other one of the two points input data in the second clock cycle to obtain the real coefficient of one of the two points output data. Then, the second adder/subtractor may perform an addition/subtraction according to the first addition/subtraction output and the real coefficient of the other one of the two points input data in the third clock cycle to obtain the real coefficient of the other one of the two points output data.

On the other hand, in one embodiment, the multiplier 6221 may multiply the real coefficient of one of the two points input data by the imaginary coefficient of the twiddle factor in the first clock cycle to generate the first multiplication output. Then, the multiplier 6221 may multiply the imaginary coefficient of one of the two points input data by the real coefficient of the twiddle factor in the second clock cycle to generate the second multiplication output. Alternatively, in one embodiment, the multiplier 6221 may first multiply the imaginary coefficient of one of the two points input data by the real coefficient of the twiddle factor in the first clock cycle to generate the first multiplication output. Then, the multiplier 6221 may multiply the real coefficient of one of the two points input data by the imaginary coefficient of the twiddle factor in the second clock cycle to generate the second multiplication output. It should be noted that, the first multiplication output and the second multiplication output of the above two configurations can be used to generate an imaginary coefficient of the two points output data.

In one embodiment, the adders/subtractors 6222 include a first adder/subtractor and a second adder/subtractor. In the case where the first multiplication output and the second multiplication output for generating the imaginary coefficients of the two points output data have been generated, the first adder/subtractor performs an addition/subtraction according to the first multiplication output and the second multiplication output in the second clock cycle to obtain a first addition/subtraction output. Further, the second adder/subtractor performs an addition/subtraction according to the first addition/subtraction output and the imaginary coefficient of the other one of the two points input data in the second clock cycle to obtain the imaginary coefficient of one of the two points output data. Then, the second adder/subtractor may perform an addition/subtraction according to the first addition/subtraction output and the imaginary coefficient of the other one of the two points input data in the third clock cycle to obtain the imaginary coefficient of the other one of the two points output data.

Figure 9:
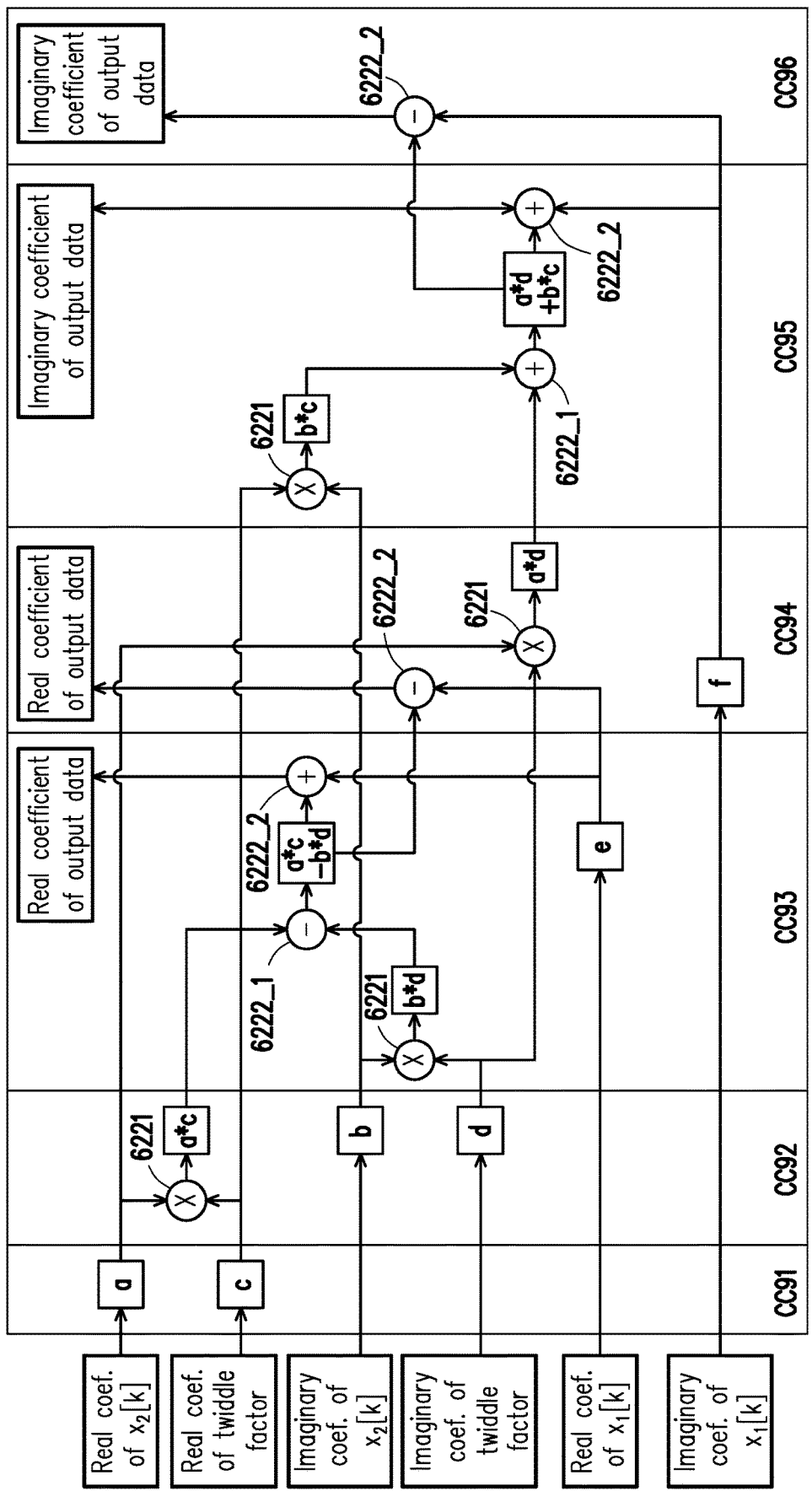
FIG. 9 is an operation schematic diagram of an FFT circuit according to one embodiment of the invention.

For clear description, FIG. 9 is an operation schematic diagram of an FFT circuit according to one embodiment of the invention. FIG. 10 is a timing diagram of a radix-2 butterfly operation according to one embodiment of the invention. Here, for convenience of explanation, it is assumed that one of the two points input data is $x_2[k]=a+bi$; the other one of the two points input data is $x_1[k]=e+fi$; and a twiddle factor $W_N^k=c+di$. In addition, the adders/subtractors 622 may include a first adder/subtractor 6222_1 and a second adder/subtractor 6222_2. Referring to FIG. 9 and FIG. 10 together, in a clock cycle CC91, the butterfly operation unit circuit 622 reads a real coefficient a of the input data $x_2[k]$ and a real coefficient c of the twiddle factor $W_N^k$ respectively from the memory circuit 621 and the twiddle factor memory circuit 623, and records the real coefficients in a register circuit.

In a clock cycle CC92, the butterfly operation unit circuit 622 reads an imaginary coefficient b of the input data $x_2[k]$ and an imaginary coefficient d of the twiddle factor $W_N^k$ respectively from the memory circuit 621 and the twiddle factor memory circuit 623, and records the imaginary coefficients in the register circuit. The multiplier 6221 may multiply the real coefficient a of the input data $x_2[k]$ by the real coefficient c of the twiddle factor $W_N^k$ in the clock cycle CC92 to generate a multiplication output a*c, and record it in the register circuit.

In a clock cycle CC93, the butterfly operation unit circuit 622 reads a real coefficient e of the input data $x_1[k]$ from the memory circuit 621 and records the real coefficient in the register circuit. The multiplier 6221 may multiply the imaginary coefficient b of the input data $x_2[k]$ by the imaginary coefficient d of the twiddle factor $W_N^k$ in the clock cycle CC93 to generate a multiplication output b*d, and record it in the register circuit. The first adder/subtractor 6222_1 performs a subtraction according to the multiplication output a*c and the multiplication output b*d in the clock cycle CC93 to obtain a subtraction output a*c−b*d, and records it in the register circuit. The second adder/subtractor 6222_2 performs an addition according to the subtraction output a*c−b*d and the real coefficient e of the input data $x_1[k]$ in the clock cycle CC93 to obtain a real coefficient e+(a*c−b*d) of output data.

In a clock cycle CC94, the butterfly operation unit circuit 622 reads an imaginary coefficient f of the input data $x_1[k]$ from the memory circuit 621 and records the imaginary coefficient in the register circuit. The multiplier 6221 may multiply the real coefficient a of the input data $x_2[k]$ by the imaginary coefficient d of the twiddle factor $W_N^k$ to generate a multiplication output a*d, and record it in the register circuit. The second adder/subtractor 6222_2 performs a subtraction according to the subtraction output a*c−b*d and the real coefficient e of the input data $x_1[k]$ in the clock cycle CC94 to obtain a real coefficient e−(a*c−b*d) of another output data.

In a clock cycle CC95, the multiplier 6221 may multiply the imaginary coefficient b of the input data $x_2[k]$ by the real coefficient c of the twiddle factor $W_N^k$ in the clock cycle CC95 to generate a multiplication output b*c, and record it in the register circuit. The first adder/subtractor 6222_1 performs an addition according to the multiplication output a*d and the multiplication output b*c in the clock cycle CC95 to obtain an addition output a*d+b*c, and records it in the register circuit. The second adder/subtractor 6222_2 performs an addition according to the addition output a*d+b*c and the imaginary coefficient f of the input data $x_1[k]$ in the clock cycle CC95 to obtain an imaginary coefficient f+(a*d+b*c) of the output data. Lastly, in a clock cycle CC96, the second adder/subtractor 6222_2 performs a subtraction according to the addition output a*c+b*d and the imaginary coefficient f of the input data $x_1[k]$ to obtain an imaginary coefficient f−(a*d+b*c) of the another output data.

Based on the description of FIG. 9 and FIG. 10, it can be known that each radix-2 butterfly operation can be divided into 6 clock cycles for execution. The multiplier 6221 performs the multiplication once in each of the clock cycle CC92 to the clock cycle CC95. The real coefficient and the imaginary coefficient of the two points output data are output in time-sharing manner. It should be noted that, the embodiments of FIG. 9 and FIG. 10 are described by taking an example in which the real coefficients of the two points output data are generated first before the imaginary coefficients of the two points output data are generated, but the invention is not limited thereto. Further, in another embodiment, the imaginary coefficients of the two points output data may be generated first before the real coefficients of the two points output data are generated. In this way, the butterfly operation unit circuit 622 can complete one radix-2 butterfly operation by reusing one multiplier 6221, thereby greatly reducing the hardware cost.

In one embodiment, the FFT circuit 62 may include one butterfly operation unit circuit 622 to complete the FFT operation by reusing the butterfly operation unit circuit 622. In one embodiment, the FFT circuit 62 may include a plurality of radix-2 butterfly operation circuits similar in structure to the butterfly operation unit circuit 622. In one implementation, these radix-2 butterfly operation circuits may constitute one or more butterfly operation circuits having a radix greater than 2, such as a radix-4 butterfly operation circuit or a radix-8 butterfly operation circuit. Alternatively, in one implementation, these radix-2 butterfly operation circuits in the FFT circuit 62 may perform all butterfly operations of one specific stage in parallel. For instance, the FFT circuit 62 may include 4 radix-2 butterfly operation circuits similar in structure to the butterfly operation unit circuit 622 to perform 4 butterfly operations of one specific stage in the FFT operation in parallel.

Figure 11:
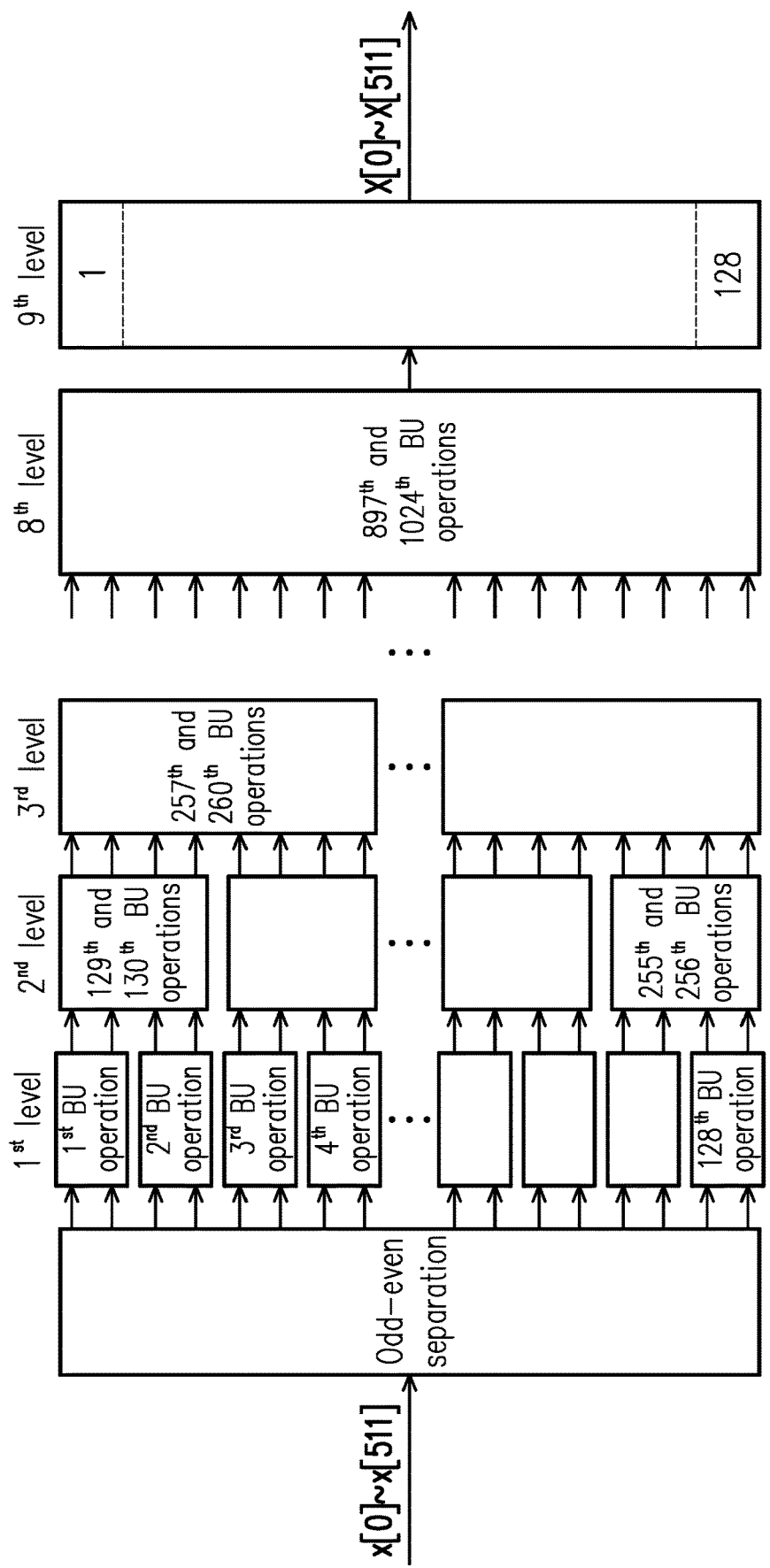
FIG. 11 is a flowchart of a radix-2 butterfly operation performed by an FFT circuit according to one embodiment of the invention.

The following description is provided by taking an example in which the FFT circuit 62 completes the FFT operations by reusing one single butterfly operation unit circuit 622. FIG. 11 is a flowchart of a radix-2 butterfly operation performed by an FFT circuit according to one embodiment of the invention. The butterfly operation unit circuit 622 can complete a radix-R N-points FFT operation, and the N points FFT includes $\log_R N$ level stage operations, wherein R is an integer greater than 1. In this embodiment, the description is provided by taking an example in which the butterfly operation unit circuit 622 completes a radix-2 512-points FFT operation and the radix-2 512-points FFT operation includes 9 level stage operations.

Referring to FIG. 11, in this embodiment, because an operation result based on the FFT operation will include conjugate symmetric complex number results, the butterfly operation unit circuit 622 can take N/2 sampling points in an $i^{th}$ level stage operation to perform a butterfly operation (abbr. BU operation in the figure) N/4 times, where i is an integer greater than or equal to 1 and less than or equal to $\log_R N$. Further, the butterfly operation unit circuit 622 sequentially writes N/2 points output data generated in the $i^{th}$ level stage operation into the memory circuit 621. In addition, because a final operation result based on the FFT operation will include two real number results and a plurality of complex results that are conjugate symmetric to each other, the memory circuit 621 needs to record the two real number results and (N/2−1) complex number results. Correspondingly, the reused memory circuit 621 needs to provide at least (N/2+1)*2 memory addresses to temporarily store FFT operation data.

In detail, the FFT circuit 62 may first perform an odd-even separation on the 512 points input data x[0] to x[511], and obtains 256 input data (e.g., {x[0], x[1]}, {x[256], x[257]}, {x[128], x[129]} {x[510], x[511]}) for the subsequent butterfly operations. That is to say, the above operations can first divide the 512 input data into 256 arrays such that each array is a parity pair from the perspective of address. In a $1^{st}$ level stage operation (i.e., i=1), the butterfly operation unit circuit 622 sequentially obtains the 256 input data and uses one single multiplier 6221 to perform Pt to $128^{th}$ butterfly operations (128 times in total) in time-sharing manner to generate 256 operation results. Two operation results of the butterfly operation performed each time may include the real coefficient and the imaginary coefficient and will be stored in the memory circuit 621. In a $2^{nd}$ level stage operation (i.e., i=2), the butterfly operation unit circuit 622 sequentially obtains the 256 operation results of the Pt level stage operation from the memory circuit 621 and uses one single multiplier 6221 to perform $129^{th}$ to $256^{th}$ butterfly operations (128 times in total) again in time-sharing manner to generate 256 operation results.

By analogy, in an $8^{th}$ level stage operation (i.e., i=8), the butterfly operation unit circuit 622 sequentially obtains 256 operation results of the $7^{th}$ level stage operation from the memory circuit 621 and uses one single multiplier 6221 to perform $897^{th}$ to $1024^{th}$ butterfly operations (128 times in total) again in time-sharing manner to generate 256 operation results. It should be noted that, in a $9^{th}$ level stage operation (i.e., i=9), the butterfly operation unit circuit 622 obtains the 256 operation results of the $8^{th}$ level stage operation from the memory circuit 621 and performs a conjugate symmetric transform operation 128 times to obtain complete 512 points output data X[0] to X[511]. Based on the above, for 512 real number points FFT of this embodiment, in the butterfly operations of the $1^{st}$ to $8^{th}$ level stages, 256 complex number results are generated in each stage, and the 256 complex number results are not conjugate symmetric to each other. In the butterfly operation of the $9^{th}$ level stage, another 256 complex result are derived according to the conjugate symmetry, and thus 512 complex results are obtained in total.

As can be known, each time after the butterfly operation unit circuit 622 performs one specific stage operation (i.e., the $1^{st}$ stage operation to the $9^{th}$ stage operation), the butterfly operation unit circuit 622 may record the operation result in the memory circuit 621. Here, based on the aforementioned symmetry property, this embodiment only needs to record a total of 257 complex number results, including a peak value (the $256^{th}$ complex number result) and symmetry values (X [0] to X [255]). Further, as each complex result includes the real coefficient and the imaginary coefficient, the memory circuit 621 needs 257*2 memory addresses in order to complete one 512 points FFT operation. Each of the memory addresses is configured to record the real coefficient or the imaginary coefficient of the complex result.

In addition, in one embodiment, when the FFT circuit 62 includes the radix-2 butterfly operation circuits similar in structure to the butterfly operation unit circuit 622, each of the radix-2 butterfly operation circuits performs the following operations of: receiving input data, and performing a butterfly operation for the input data according one twiddle factor of M twiddle factors to generate output data. The butterfly operation includes a plurality of additions/subtractions and a plurality of multiplications decomposed based on a complex operation, and M is a positive integer less than N/2. Each of the radix-2 butterfly operation circuits sequentially performs the additions/subtractions and the multiplications in a plurality of clock cycles, and the multiplication is performed at most once in each of the clock cycles. In one embodiment, the read-only memory used as the twiddle factor memory circuit 623 may be coupled to the radix-2 butterfly operation circuits and configured to store M twiddle factors, wherein M is equal to N/4.

In detail, based on the example in FIG. 9, it is known that each butterfly operation needs to read the real coefficient and imaginary coefficient of the twiddle factor from the read-only memory. The twiddle factor may be expressed as $\cos\theta - j*\sin\theta$, wherein the real coefficient of the twiddle factor is $\cos\theta$ and the imaginary coefficient of the twiddle factor is $\sin\theta$. For the butterfly operation of $i^{th}$ stage, $\theta$ will be equal to $2\pi*0/2^i, 2\pi*1/2^i, 2\pi*2/2^i, \ldots,$ and $2\pi*(2^{(i-1)}-1)/2^i$. Accordingly, as i increases, the FFT circuit 62 needs more twiddle factor corresponding to different twiddle angles. In the traditional design, the twiddle factors required for the butterfly operation in each stage are recorded in the read-only memory. However, the same twiddle factor may be repeatedly recorded. Accordingly, in one embodiment, a total number of stages of the butterfly operation may be taken to determine N/4 twiddle factors, and the read-only memory records these N/4 twiddle factors. For instance, when N=512, the butterfly operation unit circuit 622 needs to perform the butterfly operations in 8 stages (as shown in FIG. 11). Therefore, the read-only memory records these 128 twiddle factors, which are respectively corresponding to twiddle angles $2\pi*0/2^8, 2\pi*1/2^8, 2\pi*2/2^8, \ldots,$ and $2\pi*(2^{(8-1)}-1)/2^8$, so as to prevent the same twiddle factor from being repeatedly recorded in the read-only memory. The butterfly operation unit circuit 622 may obtain an appropriate twiddle factor to perform the radix-2 butterfly operation by selecting a logic circuit. Therefore, in the embodiments of the invention, the use amount of the read-only memory may be reduced through an optimized twiddle factor lookup table.

In summary, in the embodiments of the invention, the butterfly operation of the FFT can be implemented by reusing the multiplier, thereby greatly reducing the number of multipliers. In addition, by optimizing a look-up table recorded with the twiddle factors, the use of the read-only memory can be effectively reduced. As a result, the FFT circuit in the embodiments of the invention can greatly reduce the hardware cost and reduce the circuit area.

Lastly, it should be noted that, each of the above embodiments merely serves as an example in the invention instead of limitation thereto. Despite that the invention has been described with reference to above embodiments, it will be apparent to those skilled in the art that various modifications and variations can be made to the structure of the technical content disclosed in above embodiments of the invention without departing from the scope or spirit of the invention. In view of the foregoing, it is intended that the invention cover modifications and variations of this invention provided they fall within the scope of the following claims and their equivalents.

The invention claimed is:

1. A fast Fourier transform circuit of an audio processing device, configured to perform an N-points fast Fourier transform where N is a power of 2, and comprising:
   a memory circuit; and
   a butterfly operation unit circuit, coupled to the memory circuit, reading two points input data from the memory circuit, performing a butterfly operation for the two points input data according to a twiddle factor to generate two points output data, and writing the two points output data into the memory circuit, wherein the butterfly operation unit circuit comprises:
   a multiplier, sequentially multiplying a real coefficient or an imaginary coefficient of one of the two points input data by a real coefficient or an imaginary coefficient of the twiddle factor in a plurality of clock cycles, wherein the multiplier performs a multiplication once in each of the clock cycles; and
   a plurality of adder-subtractors, coupled to the multiplier, and performing an addition or a subtraction according to an output of the multiplier or a real coefficient or an imaginary coefficient of the other one of the two points input data, such that the butterfly operation unit circuit generates the two points output data,
   wherein the clock cycles comprise a first clock cycle and a second clock cycle, the multiplier multiplies the real coefficient of one of the two points input data by one of the real coefficient and the imaginary coefficient of the twiddle factor in the first clock cycle to generate a first multiplication output, and the multiplier multiplies the imaginary coefficient of one of the two points input data by the other one of the real coefficient and the imaginary coefficient of the twiddle factor in the second clock cycle to generate a second multiplication output,
   wherein the adder-subtractors comprise a first adder-subtractor and a second adder-subtractor, the first adder-subtractor performs an addition or a subtraction according to the first multiplication output and the second multiplication output in the second clock cycle to obtain a first output, and the second adder-subtractor performs an addition or a subtraction according to the first output and the real coefficient of the other one of the two points input data in the second clock cycle to obtain the real coefficient of one of the two points output data,
   wherein the clock cycles comprise a third clock cycle, the second adder-subtractor performs an addition or a subtraction according to the first output and the real coefficient of the other one of the two points input data in the third clock cycle to obtain the real coefficient of the other one of the two points output data.

2. The fast Fourier transform circuit of the audio processing device according to claim 1, further comprising:
   a twiddle factor memory circuit, coupled to the butterfly operation unit circuit, and storing the twiddle factor.

3. The fast Fourier transform circuit of the audio processing device according to claim 1, wherein the N-points fast Fourier transform is based on R points, the N-points fast Fourier transform comprises $\log_R N$ level stage operations, and the butterfly operation unit circuit performs a butterfly operation N/4 times in an $i^{th}$ level stage operation and sequentially writes N/2 points output data generated in the $i^{th}$ stage operation into the memory circuit, wherein R is an integer greater than 1, and i is an integer greater than or equal to 1 and less than or equal to $\log_R N$,
   wherein the N/2 points output data generated in the $i^{th}$ level stage operation by the butterfly operation unit circuit are not conjugate symmetric to each other, the memory circuit has (N/2+1)*2 memory addresses, and each of the memory addresses is configured to record a real coefficient or an imaginary coefficient of one of the N/2 points output data.

4. The fast Fourier transform circuit of the audio processing device according to claim 3, wherein in the $i^{th}$ level stage operation, the butterfly operation unit circuit reads the two points input data from two memory addresses of the memory circuit, and overwrites the two points output data back to the two memory addresses.

5. A fast Fourier transform circuit of an audio processing device, configured to perform an N-points fast Fourier transform where N is a power of 2, and comprising:
   a memory circuit; and
   a butterfly operation unit circuit, coupled to the memory circuit, reading two points input data from the memory circuit, performing a butterfly operation for the two points input data according to a twiddle factor to generate two points output data, and writing the two points output data into the memory circuit, wherein the butterfly operation unit circuit comprises:
      a multiplier, sequentially multiplying a real coefficient or an imaginary coefficient of one of the two points input data by a real coefficient or an imaginary coefficient of the twiddle factor in a plurality of clock cycles, wherein the multiplier performs a multiplication once in each of the clock cycles; and
      a plurality of adder-subtractors, coupled to the multiplier, and performing an addition or a subtraction according to an output of the multiplier or a real coefficient or an imaginary coefficient of the other one of the two points input data, such that the butterfly operation unit circuit generates the two points output data,
   wherein the clock cycles comprise a first clock cycle and a second clock cycle, the multiplier multiplies the real coefficient of one of the two points input data by one of the real coefficient and the imaginary coefficient of the twiddle factor in the first clock cycle to generate a first multiplication output, and the multiplier multiplies the imaginary coefficient of one of the two points input data by the other one of the real coefficient and the imaginary coefficient of the twiddle factor in the second clock cycle to generate a second multiplication output,
   wherein the adder-subtractors comprise a first adder-subtractor and a second adder-subtractor, the first adder-subtractor performs an addition or a subtraction according to the first multiplication output and the second multiplication output in the second clock cycle to obtain a first output, and the second adder-subtractor performs an addition or a subtraction according to the first output and the imaginary coefficient of the other one of the two points input data in the second clock cycle to obtain the imaginary coefficient of one of the two points output data,
   wherein the clock cycles comprise a third clock cycle, the second adder-subtractor performs an addition or a subtraction according to the first output and the imaginary coefficient of the other one of the two points input data in the third clock cycle to obtain the imaginary coefficient of the other one of the two points output data.

6. A fast Fourier transform circuit of an audio processing device, configured to perform an N-points fast Fourier transform where N is a power of 2, and comprising:
   a plurality of radix-2 butterfly operation circuits, wherein each of the radix-2 butterfly operation circuits performs steps of: receiving input data, and performing a butterfly operation for the input data according to one twiddle factor of M twiddle factors to generate output data, wherein the butterfly operation comprises a plurality of additions and subtractions and a plurality of multiplications decomposed based on a complex operation, and M is a positive integer less than N/2,
   wherein each of the radix-2 butterfly operation circuits sequentially perform the additions or the subtractions and the multiplications in a plurality of clock cycles, and the multiplication is performed at most once in each of the clock cycles,
   wherein one single multiplier is used in each of the radix-2 butterfly operation circuits to perform the multiplications,
   wherein each of the radix-2 butterfly operation circuits further comprises:
      a memory circuit, configured to store the input data and the output data, and having (N/2+1)*2 memory addresses, wherein each of the memory addresses is configured to record a real coefficient or an imaginary coefficient of one of N/2 points output data.

7. The fast Fourier transform circuit of the audio processing device according to claim 6, wherein each of the radix-2 butterfly operation circuits further comprises:
   a plurality of adder-subtractors, coupled to the multiplier, and performing an addition or a subtraction according to an output of the multiplier or a real coefficient or an imaginary coefficient of the input data, such that the butterfly operation unit circuit generates the output data.

8. The fast Fourier transform circuit of the audio processing device according to claim 6, further comprising:
   a read-only memory, coupled to each of the radix-2 butterfly operation circuits, and storing the M twiddle factors, wherein M is equal to N/4.

9. The fast Fourier transform circuit of the audio processing device according to claim 6, wherein at least part of the radix-2 butterfly operation circuits constitute one or more butterfly operation circuits having a radix greater than 2.

* * * * *